Sept. 21, 1948.   A. WOLF   2,449,921
SEISMIC METHOD OF LOCATING FAULTS
Filed Dec. 24, 1943   2 Sheets-Sheet 1

INVENTOR.
ALEXANDER WOLF
BY
R. J. Dearborn
ATTORNEY

Sept. 21, 1948.     A. WOLF     2,449,921
SEISMIC METHOD OF LOCATING FAULTS

Filed Dec. 24, 1943     2 Sheets-Sheet 2

INVENTOR.
ALEXANDER WOLF
BY
R. J. Dearborn
ATTORNEY

Patented Sept. 21, 1948

2,449,921

UNITED STATES PATENT OFFICE 2,449,921

SEISMIC METHOD OF LOCATING FAULTS

Alexander Wolf, Houston, Tex., assignor to The Texas Company, New York, N. Y., a corporation of Delaware Application December 24, 1943, Serial No. 515,486

1 Claim. (Cl. 181—0.5)

This invention relates to seismic methods of exploring the earth's upper strata and more particularly to a method of locating and determining the dip and strike of faults.

This application is a continuation-in-part of my copending applications, Serial Nos. 483,750 (now Patent No. 2,431,600, granted November 25, 1947) and 492,025, filed April 20, 1943, and June 24, 1943, respectively.

In geology the word "fault" designates a crack in the crust of the earth, along which there has been a displacement of materials relative to each other. The plane of such a crack (the fault-plane) may be inclined to the horizon by a few degrees only, or it may be almost at right angles to the horizon. The angle between the horizon and the fault-plane is called the "dip" of the fault. The direction of the line forming the intersection between the fault-plane and the horizon is called the "strike" of the fault. These two quantities, plus the relative vertical displacement, i. e., the "throw" of the materials on the two sides of the fault-plane furnish a complete description of a fault. Obviously, a fault-plane is a plane by courtesy only since its strike varies from place to place and the throw changes not only laterally but also vertically.

The location of faults is of interest to the oil prospector, partly because ignorance of their existence may lead to incorrect conclusions in the interpretation of other geological data, and partly because a fault with a throw in excess of the thickness of a producing sand forms a boundary which is one of the prerequisites of oil accumulation.

Under favorable conditions, faults have been located with seismic methods by using the well known or conventional reflection technique in which a characteristic reflection is mapped over a large area. A fault is characterized by a sudden change in depth of this reflection. This conventional method fails in many areas for one of two reasons: (1) Either there may be no reflections from stratigraphic interfaces which can be traced consistently over a large area, or (2) the reflections may change in character or disappear completely in the vicinity of a fault. This second condition is encountered quite often in the case of reflected waves which would have to penetrate the fault-plane in order to reach the surface. Thus, vital information may be lacking just in the areas where it is needed most. Because of the factors outlined above, the location of faults has always been one of the most difficult problems in seismological prospecting, and the results which have been obtained have frequently been incorrect.

It has been known for some time that another clue may exist which would locate a fault quite definitely, and that is a reflection from the fault-plane itself. Since lithological changes may occur at the fault-plane where different beds are brought into contact, the fault-plane itself may act as a reflecting surface. Such reflections have been reported at various times but their recognition is fortuitous rather than systematic for reasons which are obvious from the geometry of the system. At all locations at which reflections from the fault-plane might be observed, there will be observed also the reflections from stratigraphic interfaces, i. e., from the normal bedding planes of the formations. The single reflection from the fault-plane superimposed on a mass of reflections from bedding planes may well escape the attention of the interpreter.

A solution of this difficulty lies in the employment of the technique suggested by the aforementioned copending applications, Serial Nos. 483,750 and 492,025. In the copending application Serial No. 483,750, now Patent No. 2,431,600, a seismic exploration method is disclosed wherein it is proposed to discriminate against waves reflected from horizontal beds or gently dipping beds so that reflections superimposed from steeply dipping beds may appear clearly on the record. In accordance with the disclosure in that application an arrangement of detectors is employed which secures a record of the differences between the outputs of a series of detectors placed in line on the surface of the ground. The detectors are connected to a recording device either directly or through an amplifier in such a manner that the outputs or pairs of detectors are in phase opposition. In this manner waves reflected from a horizontal or a substantially horizontal formation strike the detector at about the same time so that the net output of the detectors is always zero, whereas a wave reflected from a steeply dipping bed strikes the detectors some time interval apart and thus there is little decrease in the sensitivity of the waves reflected from the steeply dipping formations.

In the copending application Serial No. 492,025, a seismic exploration method is disclosed which embodies principles somewhat similar to those described in the foregoing paragraph, but by means of which phase differences introduced by dip of the stratigraphic interfaces or by weathering may be eliminated. Instead of recording the outputs of the detectors in the form of wavy lines on paper or film the outputs of the detectors are recorded on multiple "sound" tracks on a film strip such as are employed in the motion picture industry. The record is then passed in front of beams of light passing through a system of slits, and light passing through any two of the tracks and their corresponding slits is caused to fall upon two light-sensitive devices such as photoelectric cells and these cells are connected in opposition to a recording galvanometer which records the differences between the outputs of the two cells. Where difficulty is encountered because of weathering differences or because of appreciable dips of the beds, reflections from which it is desired to eliminate, the slits may be displaced with respect to each other in a direction longitudinally of the film strip, and, by varying the amount of this displacement of the slits, waves arriving substantially at any angle can be canceled, regardless of the time shift introduced by weathering.

Thus the method described in Patent No. 2,431,600 permits one to suppress the reflections from the nearly horizontal bedding planes so that the steep wave front reflected from the fault-plane may be recognized on the reflection seismograms. This is accomplished by connecting detectors in pairs in opposition as shown in Figure 4, which will be described hereafter, so that a horizontal wave front is canceled, whereas a wave front arriving at an angle to the vertical is recorded, or by the more elaborate instrumental interconnections for which reference may be made to the aforementioned patent. In cases where the bedding planes of the formations are inclined to the vertical by more than a few degrees and in cases where difficulty is encountered because of weathering differences, the technique disclosed in application Serial No. 492,025 will permit this suppression.

It is obvious that to record reflections from a steeply dipping fault-plane the instruments must be placed a considerable distance from the outcrop of the fault. In case of a fault dipping at, say, 45°, in order to record a reflection from a depth of 5000 feet the instruments must be about 10,000 feet from the fault outcrop.

The method of locating faults by recording reflections from the fault-plane itself, which has been described in a preceding paragraph, is not always successful; perhaps because the fault-plane does not always constitute a good reflecting surface. In the course of experiments in this direction, however, a new and unexpected phenomenon has been discovered; namely, waves which arrive at the surface as if they were reflected from imaginary interfaces, i. e., stratigraphic interfaces which do not actually exist. These waves give an alternative clue as to the existence and location of the fault, or at least corroborative evidence.

In accordance with the invention, a series of shot points are selected along a line crossing the expected fault and seismic detectors are placed along the line of shot points. Reflections are recorded in the conventional manner from stratigraphic interfaces, i. e., actual interfaces between beds which are substantially horizontal or but slightly dipping. Reflections are also recorded by methods such as are described in the copending applications Serial Nos. 483,750 and 492,025; i. e., reflections appearing on the records while the ordinary reflections from stratigraphic interfaces are eliminated. From the reflections obtained from actual interfaces and from the other reflections which may be obtained while eliminating the reflections from the actual interfaces, the position of the fault is calculated and may be plotted in cross section.

For a better understanding of the invention, reference may be had to the accompanying drawing in which Figure 1 is a sectional elevation of the upper earth strata containing a fault;

Figure 3 is a view somewhat similar to Figure 2 but showing reflections from apparent but unreal boundaries or interfaces; while

Figure 1:
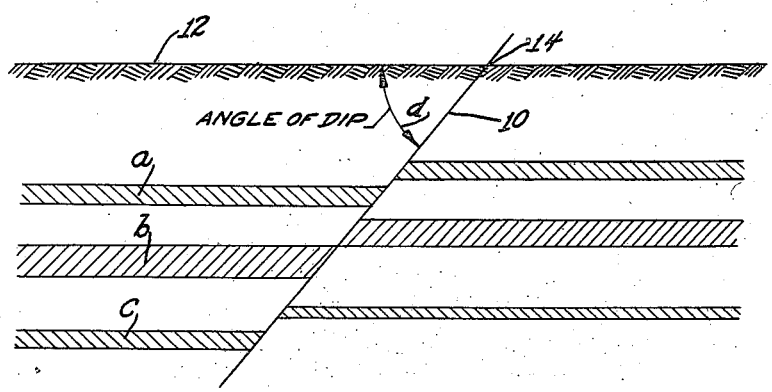

In Figure 1 is shown a cross section of the upper earth strata in which a fault 10 intersects the earth's surface 12 at the point 14. It will be noted that the several strata, $a$, $b$ and $c$ are not continuous but that they have been severed by the fault and these strata have been moved upwardly as shown in the right-hand side of the fault 10. The angle $d$ which the fault plane 10 makes with the earth's surface 12 is the dip of the fault and the direction of the line of intersection of the fault plane with the earth's surface is known as the strike.

Figure 2:
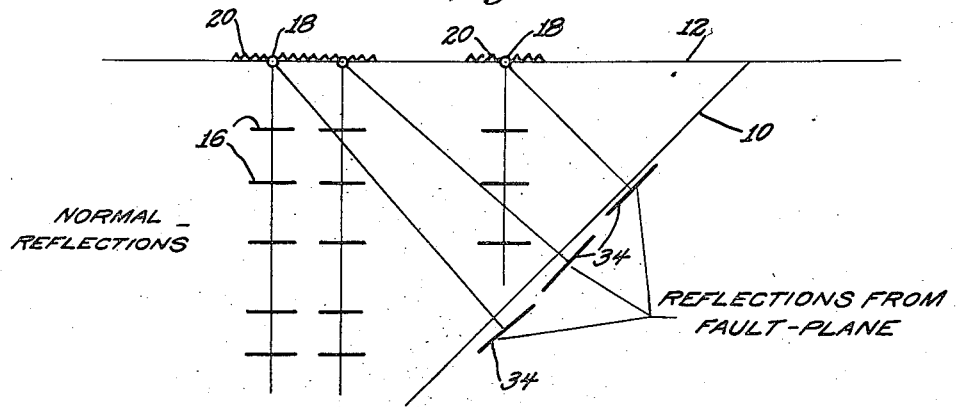
Figure 2 is a diagrammatic illustration showing reflections from a fault-plane.
Figure 4:
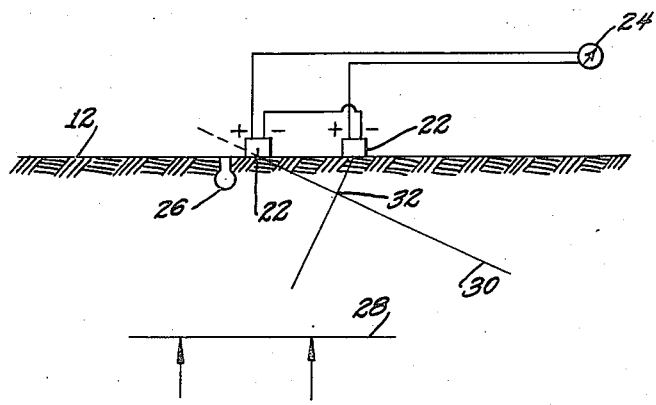
Figure 4 is an elevation illustrating a series of detectors connected in opposition.

In Figure 2 the fault 10 is shown with relation to stratigraphic interfaces, i. e., boundaries between actual strata, indicated diagrammatically at 16. A line of shot points 18 is shown disposed along the earth's surface 12 and seismic detectors 20 are arranged preferably symmetrically with relation to the shot points 18. With the arrangement shown in Figure 2, a charge is fired at one of the shot points 18 and reflections are recorded in a conventional manner from the interfaces 16 so that the dip of these strata can be determined. Reflections are also recorded by means of the detectors 20 from surfaces real or imaginary while simultaneously the reflections from the actual interfaces 16 are eliminated. As has been stated above, these other reflections may be obtained by connecting the detectors 20 to their recording devices in opposition as described in copending applications Serial Nos. 483,750 and 492,025. In Figure 4 two seismic detectors 22 of the electrical type are placed on or directly below the surface of the ground and their outputs are connected in phase opposition to a suitable recording galvanometer 24 either directly or through an amplifier, not shown. An explosive charge is fired at the shot point 26, and a wave, the front of which is represented by the line 28, reflected from a substantially horizontal bed such as bed $a$ of Figure 1, strikes both detectors 22 at substantially the same time. Since the detectors are connected in opposition their net output is zero for the actual wave front but a wave, having the front 30 reflected from a steeply dipping bed or surface such as the fault 10 of Figure 1 or 2, strikes the two detectors some interval apart depending upon the speed of propagation and the distance between the right-hand detector 22 and the point indicated by the ordinal 32. Thus, the detector system shown in Figure 4 has zero sensitivity for a wave traveling vertically and increasingly higher sensitivity as the direction of propagation departs increasingly from the vertical. It is understood that each of the instruments 20 shown in Figure 2 may comprise a pair of detectors, such as shown in Figure 4, connected in phase opposition to an indicating or recording device. With such an arrangement individual reflections from the actual interfaces 16 can be eliminated while steeply dipping reflections from the fault plane, as indicated diagrammatically by the lines 34, may be recorded. As is shown in Figure 2, if the shot points are located at some considerable distance from the outcrop of the fault 10, these reflections can be considered as coming from the fault and in plotting the points of reflections as in Figure 2 a line drawn substantially through the reflection points 34 will indicate the cross section of the fault.

Figure 3:
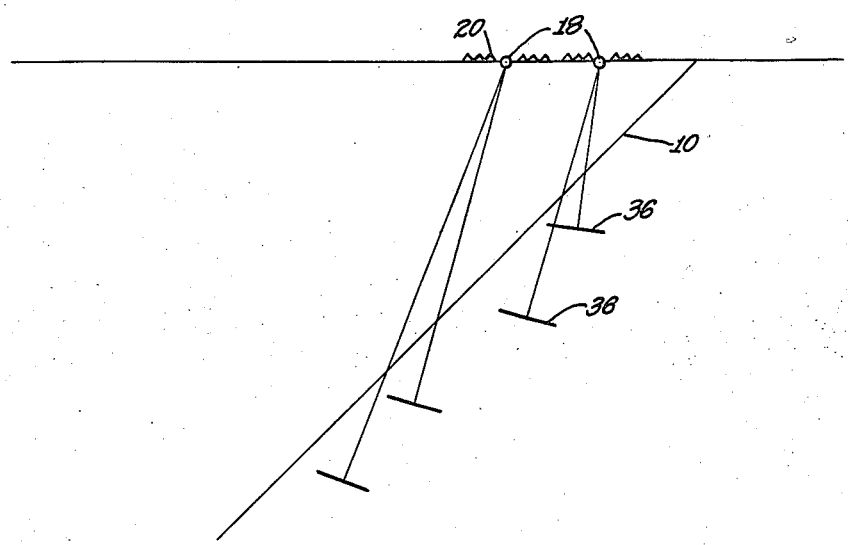

As stated hereinbefore, the reflections directly from the fault plane are not always obtained, and Figure 3 is a diagrammatic illustration of a situation in which there may be no reflections directly from the fault and also in which reflections from actual interfaces may be absent or too confused to be meaningful. It will be observed that in Figure 3 the shot points 18 are closer to the outcrop of the fault than as shown in Figure 2, and it has been observed that where the arrangement of shot points 18, detectors 20 and the fault 10 are as indicated in this figure, reflected waves have arrived at the surface indicating that they came from interfaces positioned at the points 36 which points it has been determined are not located on actual boundaries; in other words, the sloping lines at the points 36 would seem to be imaginary boundaries or interfaces. These reflections appear on records obtained above the fault plane perhaps 500 feet to as many as 3000 feet away from the fault outcrop. These reflections are characterized by a dip opposite in direction to that of the fault plane and their angle of emergence ranges from 10° to as much as 30°, this angle of emergence usually increasing with depth. Conventional methods of calculating the position of the points of reflections 36 yield results which place these points in the vicinity of the fault plane, usually immediately under the fault plane. Considerable work which has been done on numerous known faults in the Gulf Coast region of Texas and Louisiana indicates that these reflections are invariably associated with faults and hence form an excellent criterion as to the existence of faulting. The nature of the reflections is not quite clear at present and geological evidence points to the fact that they occur even though the interfaces between the various beds are practically horizontal. The large angle of emergence may perhaps be explained on the assumption of diffraction at the ends of the strata where these are broken by the fault.

The strike of the fault may be determined by correlation between the results obtained along several lines of shot points which are found to cross the fault outcrop, or, under favorable conditions, may be obtained by measuring the "strike" of the reflections 34 in Figure 2 or 36 in Figure 3 by means well known in the art. This is accomplished by setting up the line of detectors at various azimuthal angles and determining the azimuth of the greatest apparent dip. The direction at right angles to that azimuth, the "strike" of the reflection, is found to coincide very nearly with the strike of the fault.

It is evident then that a method has been provided which indicates the location of the fault plane and also the direction of its dip and strike. The "throw" of the fault may sometimes be determined by correlating reflections on the two sides of the fault.

In summarizing the foregoing, the method of locating a fault in accordance with this invention consists in selecting shot points along a line more or less at right angles to the expected strike of the fault, placing the detectors along the line of shot points and preferably symmetrically relative to each shot point, and recording reflections both by the conventional methods which indicate the dip and the position of the various beds and strata, and also recording, as by connecting a series of detectors in phase opposition, whatever reflections may appear on the records after the ordinary reflections from the stratigraphic interfaces have been eliminated. Usually the position of all reflecting beds is calculated and plotted in cross section and the position of any reflections, which may appear on the records obtained when the reflections from the actual interfaces are eliminated, is plotted on the same cross section. If these reflections present the pattern of Figure 2, the fault plane is drawn along the reflections; if they present the pattern of Figure 3, the fault plane is drawn to pass above the reflection points and below the shot points from which they were recorded. The conventional reflection records may then be re-examined for any evidence of faulting which they may show and for any clue as to the amount of throw. If a doubt exists as to the strike of the fault, the strike of the reflections obtained, while reflections for actual interfaces are eliminated, may be measured by successively rotating the line of the detectors and thus determining the direction in which the greatest apparent dip is indicated. A line at right angle to the direction of the greatest dip is the strike of the fault, or the strike may be determined by correlation between several lines crossing the fault.

Obviously many modifications of the invention, as hereinbefore set forth, may be made without departing from the spirit and scope thereof, but only such limitations should be imposed as are indicated in the appended claims.

I claim:

A method of locating the position of a fault in an area in which the presence of a fault is suspected, which comprises selecting a series of shot points along a line substantially at right angles to the expected strike of the fault, placing groups of seismic detectors along said line of shot points, each group of detectors being disposed substantially symmetrically with regard to its respective shot point, firing an explosive at each of said shot points, recording seismic reflections received by said detectors from substantially horizontal beds to indicate the dip and position of said beds, recording other reflections obtained while simultaneously eliminating reflections from said substantially horizontal beds, and determining, from the reflections obtained from said substantially horizontal beds and from said other reflections, the position of the fault.

ALEXANDER WOLF.

REFERENCES CITED

The following references are of record in the file of this patent:

UNITED STATES PATENTS

| Number | Name | Date |
| --- | --- | --- |
| 2,087,702 | Peters | July 20, 1937 |
| 2,099,837 | Blau | Nov. 23, 1937 |
| 2,215,297 | Owen | Sept. 17, 1940 |
| 2,216,452 | Owen | Oct. 1, 1940 |